C. E. FOSTER.
ELECTRICAL MEASURING INSTRUMENT.
APPLICATION FILED FEB. 24, 1908.
959,497.
Patented May 31, 1910.
Fig. 1.
Fig. 2.
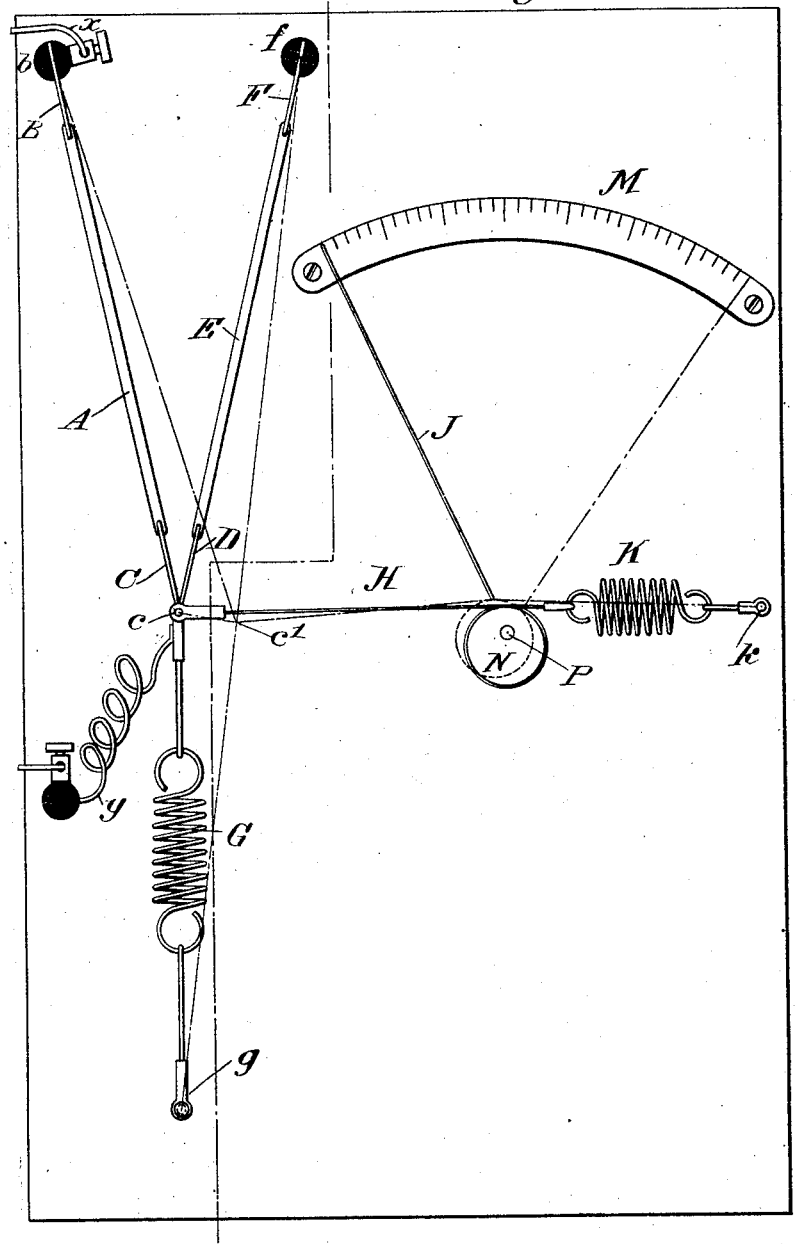
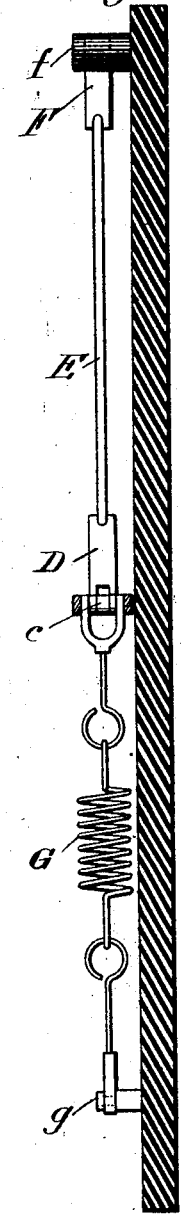
Witnesses
Walter B. Payne
H. H. Simms
Inventor
Charles Edwin Foster
By Church & Rich
His Attorneys

UNITED STATES PATENT OFFICE.

CHARLES EDWIN FOSTER, OF ROCHESTER, NEW YORK.

ELECTRICAL MEASURING INSTRUMENT.

959,497.  Specification of Letters Patent.  Patented May 31, 1910.

Application filed February 24, 1908. Serial No. 417,255.

*To all whom it may concern:*

Be it known that I, CHARLES EDWIN FOSTER, of Rochester, county of Monroe, and State of New York, have invented certain new and useful Improvements in Electric Measuring Instruments; and I do hereby declare the following to be a full, clear, and exact description of the same, reference being had to the accompanying drawings, forming a part of this specification, and to the reference-letters marked thereon.

The present invention relates to electrical measuring instruments of the "thermal type," or more particularly those in which the quantities to be measured cause a part to become longer and shorter under the action of heat, and it has for an object to secure constance in the value of the readings of the instrument and the elimination of errors due to the change in the condition of the heat affected portion.

To this and other ends the invention consists in certain improvements and combinations of parts all as will be hereinafter more fully described, the novel features being pointed out in the claims at the end of the specification.

In the drawings: Figure 1 is a diagrammatic view of an indicating current meter to which my invention has been adapted; and Fig. 2 is a detail view of the thermal or heat affected portion.

The invention although embodied in an indicating current meter is not limited to this application. As shown, it comprises a thermal member A consisting preferably of a fine wire of some metal which does not easily oxidize and which has a large temperature coefficient of expansion. At the ends of the thermal member are arranged the bending members which preferably comprise broad, thin strips B and C formed, if desirable, by rolling wire of relatively large cross section thereby offering less resistance to the current than the thermal member, so that the passage through them of the current does not materially affect them. They are disposed so that they offer the least possible resistance to the resultant bending when the wire A becomes longer or shorter. By this construction, those portions of the instrument which are subjected to bending or twisting stresses are not appreciably heated by the electrical quantities to be measured or recorded and conversely those portions of the instrument which are heated by the electrical quantity to be measured are not subjected to bending or twisting stresses, thereby avoiding all errors which would be due to subjecting the thermal member to varying bending stresses while it is being heated or cooled. Another thermal member E is provided as nearly as possible like member A in length cross section and material, and it is connected to bending members D and F which are constructed like the members B and C. The members B and F are firmly secured to insulated supports $b$ and $f$ on the frame of the instrument, while the members C and D are joined together at the point $c$. Also secured to both members C and D at the point $c$, is a tension member G, preferably embodying a helical spring secured to the frame by a hinge or otherwise at $g$ so as to swing. This serves to retain the members A and E straight and under tension.

The thermal member E with the bending members D and F, acts as a device for reducing the action of the spring on the thermal member A as the latter becomes hotter. In other words, the force that keeps the thermal member A in tension rapidly diminishes as the temperature of the thermal member rises, so that the tension is at all times within the elastic limits of the thermal member, and when the thermal member cools it returns to its original length, thereby avoiding any errors which would result from the continued application in the thermal member of a large force in tension, when it is subjected to an electrical overload and when it is consequently less able to resist permanent distortion or stretching.

It is preferable to employ some means of multiplying the elongation of the thermal member and for this purpose I may provide an indicator comprising preferably a dial M and a movable pointer or index J, having suitable connection with the thermal member. In constructing this connection I may take advantage of the fact that the heat generated in a wire is approximately proportional to the square of the electrical current passing through it, thereby causing the wire or thermal member as it becomes hotter to suffer increasing increments of elongation for equal or uniform increments of current. By taking advantage of this "square law" relation between the current and the elongation, it is possible to use a small ratio of multiplication of the higher readings of the instrument, and thus the tension in the thermal member can be made safely smaller when the thermal member is hotter and yet a margin of force will be left to overcome the friction of the measuring or indicating mechanism. By this means I can avoid any errors which would be due to the employment of too small an initial tension.

In the present embodiment the connection between the thermal member and the indicator comprises a flexible connector H, preferably secured at one end to the thermal members at the point C, and having its other end secured to and passed about an eccentrically mounted drum N, which moves the pointer J about pivot P. A spring K secured by a hinge or otherwise at $k$ maintains a tension on the flexible connector H, but the force of the spring must not be so great that the tension on thermal member E is relaxed.

The action of the instrument is as follows: The current to be measured, or a known proportion of it, passes through the thermal member A and the bending members B and C, which are connected to the circuit by suitable leads $x$, $y$ of flexible form if desired in order to avoid hampering the movement of the mechanism. As the current does not pass through the thermal member E it causes a rise in temperature in the member A only, and consequently an elongation of the latter. Now A, with its extensions B and C, forms one side of a triangle $b$, $c$, $f$, and since the base $b$, $f$ is fixed in length and position and the side $e f$ does not alter in length, it follows that the apex $c$ will swing in an arc of a circle whose center is at $f$. Because the angle $b$, $c$, $f$ is an acute angle, the movement of the point $c$ will be approximately the direction of connector H, and the spring K will cause a rotation of the drum N with a consequent motion of the pointer J over the scale M. As the current passing through A increases, the movement of the mechanism proceeds until a position $c'$ has been assumed, its path of travel being approximately indicated by dotted lines Fig. 1. In this position it is evident that the tension due to the spring G is almost wholly supported by the thermal member E and there will be but little tension on member A. In fact, the movement may be continued until there is no tension on A beyond that due to its own weight. Changes in atmospheric temperature will affect both members A and E equally and the resultant motion of the point $c$ will be in such a direction as to produce no detectable deflection of the pointer J. I may cause two currents whose difference I desire to ascertain to pass one through A and the other through E in accordance with Field's method, and in this manner the instrument may be used as an indicating wattmeter.

What I claim is:

1. The combination with a pair of thermal members arranged at an angle to each other and connected together, of a tension device acting on both members at their point of connection and mounted to swing with said point in a direction transverse to the direction of the pull of said tension device, means for directing an electric current through one of the members and means for determining the transverse movement of the point of connection.

2. The combination with a pair of thermal members arranged at an angle to each other and connected together, of a tension device acting on both members and secured at one end to swing and at its other end connected to the thermal members at their point of connection, means for directing an electric current through one of said thermal members and means for determining the movement of said point of connection.

3. The combination with a pair of thermal members arranged at an angle to each other and connected together, of a tension device acting on both members at their point of connection, an indicator, and a flexible connection between the indicator and the thermal members extending from their point of connection in a direction transverse to the direction of the pull of the tension device.

4. The combination with a thermal member, of a pair of bending members at the ends of the thermal member, having greater flexibility than the thermal member and offering less resistance to the passage of an electric current, and means for directing an electric current through the bending members and the thermal member.

5. The combination with a thermal member, of a pair of bending members arranged at the end of the thermal member and each comprising a broad thin strip having greater flexibility than the thermal member, and offering less resistance to the passage of an electrical current, and means for directing an electric current through the bending members and the thermal member.

6. The combination with a thermal member, of a bending member having greater flexibility than the thermal member and offering less resistance to the passage of an electric current, means for directing an electric current through the thermal and the bending member, and an indicator operated by said thermal member.

7. The combination with a pair of thermal members, of bending members arranged at the ends of the thermal members, one bending member of one thermal member being connected to a bending member of the other thermal member, a tension device connected to the connected bending members, and an indicator connected to the same bending members.

8. The combination with a pair of thermal members, of bending members arranged at the ends of the thermal members, one bending member of one thermal member being connected to a bending member of the other thermal member, a tension device connected to the connected bending members, and an indicator embodying a movable member, an eccentrically mounted drum connected to the movable member, a flexible connection between the drum and the connected bending members, and a tension device acting on said drum.

CHARLES EDWIN FOSTER.

Witnesses:
RUSSELL B. GRIFFITH,
HAROLD H. SIMMS.